July 10, 1945.  E. T. ERSEPKE  2,379,956
DOUGH FORMING DEVICE
Filed May 3, 1944  2 Sheets-Sheet 1
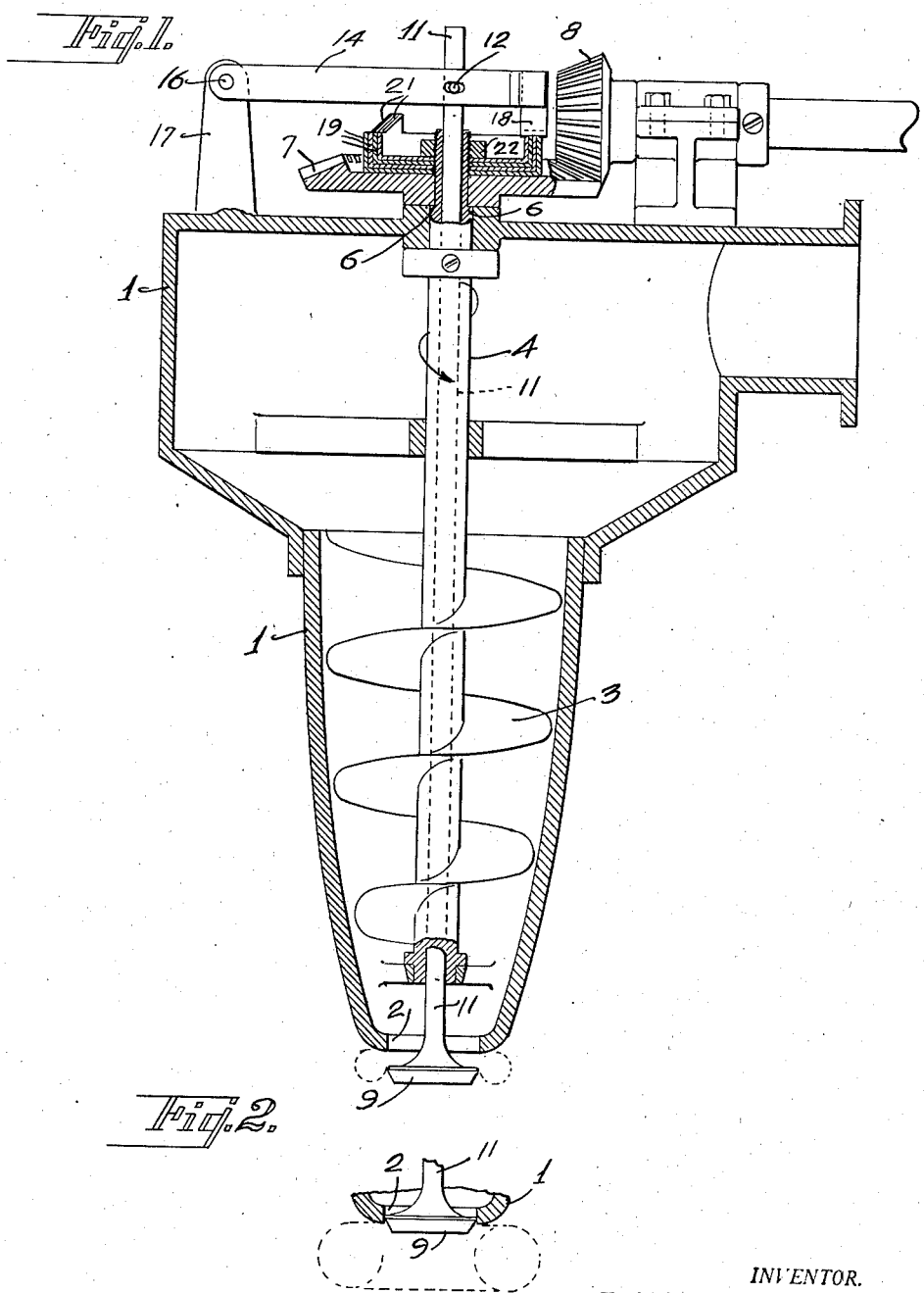
INVENTOR.
EDMUND T. ERSEPKE
BY
Arthur L. Slee
HIS ATTORNEY.

July 10, 1945.                 E. T. ERSEPKE                    2,379,956
                            DOUGH FORMING DEVICE
                            Filed May 3, 1944              2 Sheets-Sheet 2
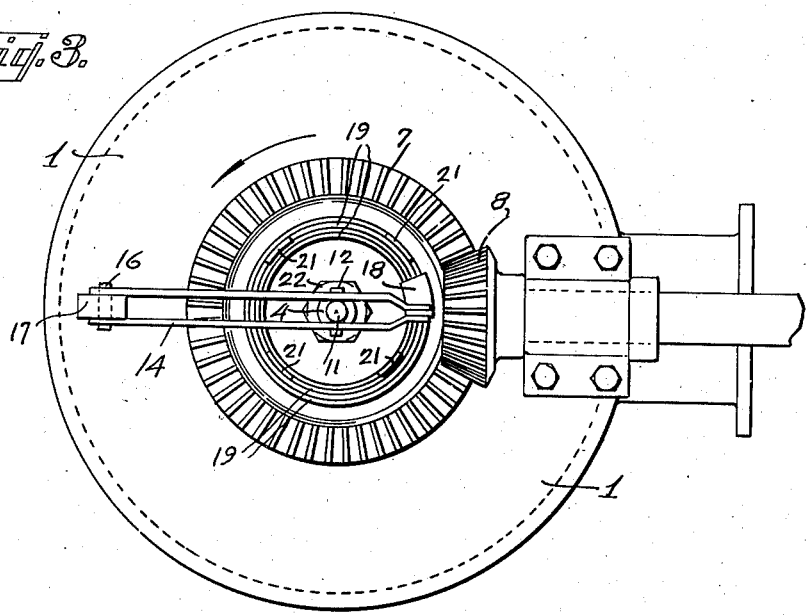
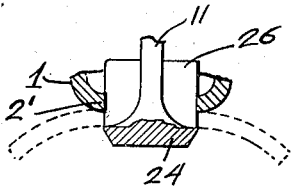 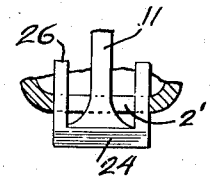
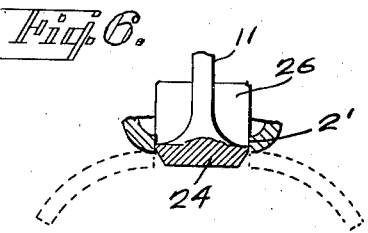 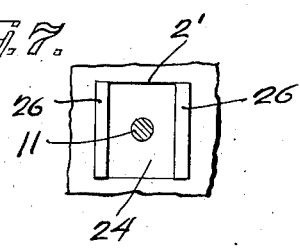
INVENTOR.
EDMUND T. ERSEPKE
BY
*Arthur L. Slee*
HIS ATTORNEY.

Patented July 10, 1945

2,379,956

UNITED STATES PATENT OFFICE 2,379,956

DOUGH FORMING DEVICE

Edmund T. Ersepke, San Francisco, Calif.

Application May 3, 1944, Serial No. 533,959

2 Claims. (Cl. 107—14)

The present invention relates to improvements in a dough-forming and dispensing device wherein a feeding worm rotatably mounted within a vertically disposed hopper having a normally open dough-forming discharge port in the bottom thereof, operates in conjunction with a die or cutter in turn cooperating with said port to sever dough extruded therethrough into several shapes, such as doughnuts or rolls, at one or more regular intervals during each rotation of a feeding worm, or from a predetermined mass of dough extruded through said port.

The primary object of the present invention is to provide a new and improved doughnut-forming device of greatly simplified construction and operation.

Another object is to provide a new and improved device of the character set forth having improved means for forming doughnuts, rolls, and the like, from raw dough.

A further object is to provide a new and improved device of the type described in which a predetermined mass of rough dough may be severed, during extrusion, at one or more regular intervals to provide varying amounts or sections.

A still further object is to provide a new and improved doughnut or roll forming device having greatly simplified and improved means for automatically relieving undue back-pressure upon a mass of dough being extruded and severed.

I accomplish these and other objects by means of the improved device disclosed in the drawings forming a part of the present application, and in which—

Fig. 1 is a vertical sectional view of the device in open or extruding position;

Fig. 2 is a fragmental or broken sectional view of the lower portion of Fig. 1, with the parts in closed or cutting position.

Fig. 3 is a plan view of the device, disclosing the nested cams;

Fig. 4 is a fragmental sectional view of a modified form of the device for producing flat dough ribbons, for rolls;

Fig. 5 is a similar view taken at right angles to Fig. 4;

Fig. 6 is a view similar to Fig. 4 but disclosing the same in closed or severing position;

Fig. 7 is a broken plan view of Fig. 5; and

Fig. 8 is a broken detail of one of the actuating cams.

Referring to the drawings:

The numeral 1 is used to designate in general a hopper having an open dough-forming discharge port 2, preferably circular, in the bottom thereof. A vertically disposed hollow-stemmed worm or feeding device 3 is rotatably mounted within said hopper 1 and has the hollow stem or shaft 4 thereof extended upwardly and exteriorly of the top of the hopper 1, as fully disclosed in Fig. 1 of the drawings.

The stem 4 is provided with an annular shoulder 6 upon which is seated a bevel gear 7 meshing with and driven by a pinion 8 in turn actuated by a source of power, not shown.

The periphery of the worm 3 is slightly smaller than the internal portion or interior of the hopper 1 so that said worm 3 is held substantially in slight spaced relation to the interior of said hopper 1, the purpose of which will hereinafter be more fully set forth.

Arranged to move into and out of the dough-forming discharge port 2 of the hopper 1 is an exterior valve, die or cutter 9 having a stem 11 slidably mounted within and passing upwardly through the hollow shaft 4 of the worm 3 and above the top of said hollow shaft. The upper end of the stem 11 is provided, above the hollow stem 4, with laterally extended pins 12 which are operatively engaged by a lever 14 fulcrumed as at 16 to the top of a lug or standard 17 on the top of the hopper 1, the free end of said lever 14 being provided with a shoe 18 which normally rides upon the edges of nested cups 19 provided with registering or matching cams 21 and adjustably held upon and to the gear 7 by means of a nut 22, the purpose of which hereinafter will more fully appear.

The cutter or die 9 and its centrally disposed stem 11 are round so that the same, operating in conjunction with the circular dough-forming discharge port 2, will form a tubular extrusion of raw dough, when said raw dough is forced therethrough by operation of the feed worm 3, which dough tube, when severed at regular intervals later described, will form dough rings or a doughnut.

In Figs. 4 to 7, inclusive, I have illustrated a modified form of the invention in which the dough-forming discharge port 2' is rectangular or square in shape and the cutter or die 24 is shaped to match and is further provided with inwardly extending wings or flanges 26 on opposite sides thereof so that when said cutter or die 24 is fully opened or away from the port 2', oppositely positioned side slots are formed through which raw dough may be extruded by operation of the feed worm 3 in the form of flat ribbons for the production of rolls and other forms of pastry.

In operation:

Raw dough, not shown, is fed into the hopper 1 in any convenient manner, and rotation of the gear 7, through the hollow stem 4, will rotate the worm 3 and normally extrude raw dough through the dough-forming discharge port 2, or 2', and around the head of the cutter or die 9 arranged in open or spaced relation thereto, thus extruding a tube of dough arranged to be severed into rings or doughnuts by the closing of said cutter or die 9.

The die or cutter 9 may be closed to sever extruded raw dough at one or more regular intervals during each rotation of the worm 3, as desired, according to the consistency of the dough being extruded or the nature of the item to be produced, by adjusting the nested cups 19 with their cam portions 21 registered or matching, as disclosed in the upper portion of Fig. 1 of the drawings, or by separating and spacing said cams into regular intervals of two, three, or even four regular spaces, as disclosed in plan view in Fig. 3 of the drawings.

In either case, as the matched or separated cams 21 pass under the shoe 18 of the free end of the lever 14, the stem 11 is raised and the cutter or die 9 is moved into the dough-forming discharge port 2 and extruded dough is severed in the form of a ring or a doughnut. It is understood that the severed ring, indicated in dotted lines in Fig. 2 of the drawings, may be dropped upon a conveyor, not shown, or into a frying vat, not shown, according to the nature of the product, to be produced.

In the case of the rectangular or square discharge port 2' and cutter or die 24 cooperating therewith, the same method as above described may be followed, but the result will be flat slabs or ribbons of raw dough instead of rings.

It should be particularly noted that the rotation of the gear 7 and cams 21 thereon will cause a closing of either die for a really brief period during each rotation of the worm 3, but should any undue back pressure develop during this brief period, such pressure may be partly relieved, if not entirely, by the fact that the worm 3 is in spaced relation to the interior of the hopper so that any excess pressure will tend to squeeze the dough, not shown, back through the annular space between said worm 3 and hopper 1, thereby automatically preventing undue strain upon the device.

Having described my invention, I claim:

1. A dough-forming and dispensing device comprising a vertically disposed hopper having a dough-forming discharge port in the bottom thereof; a hollow stemmed worm rotatably mounted within said hopper and having its periphery arranged in slight spaced relation to the interior of said hopper; a cutter arranged to move into and out of said discharge port and having a stem slidably mounted through said hollow stemmed worm; a plurality of nested and matching cams adjustably connected to said worm and cutter stem and arranged to actuate said cutter at one or more intervals during each rotation of said worm.

2. A dough-forming and dispensing device comprising a vertically disposed hopper having a dough-forming discharge port in the bottom thereof; a hollow stemmed feeding worm rotatably mounted within said hopper and having its periphery arranged in slight spaced relation to the interior of said hopper; a cutter arranged to move into and out of said port and having a stem slidably mounted through and extending above said worm and hopper; a plurality of nested and matching cams adjustably and operatively connected to said worm and to the top of said cutter stem and arranged to actuate said cutter at one or more regular intervals during each rotation of said feeding worm; and means for actuating said feeding worm and cams opertively connected thereto.

EDMUND T. ERSEPKE.